J. HOLLINGSWORTH.
Horse Hay-Rake.

No. 217,463. Patented July 15, 1879.

Witnesses:
F. B. Townsend
A. M. Munday

Inventor:
Jas. Hollingsworth
per Munday & Evarts
Attorneys

J. HOLLINGSWORTH.
Horse Hay-Rake.
No. 217,463. Patented July 15, 1879.
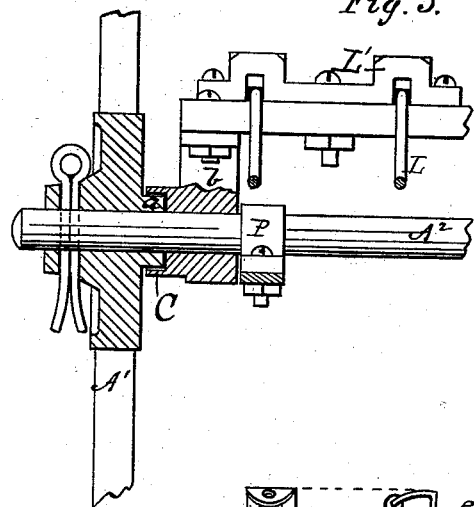
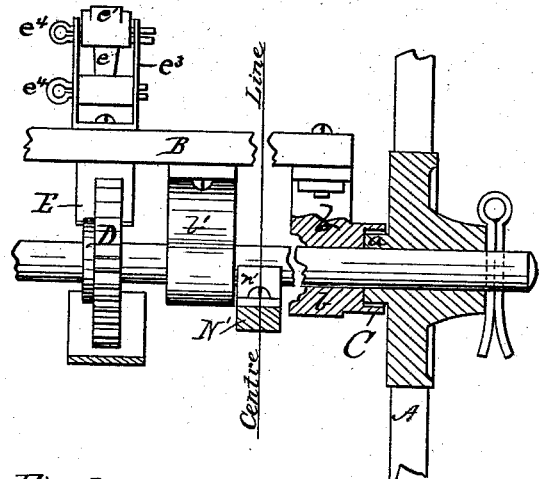
Fig. 3.
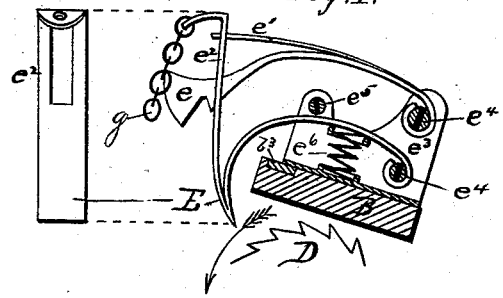
Fig. 4.
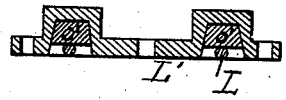
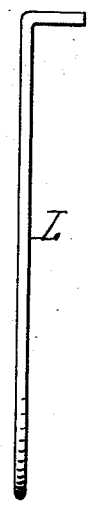
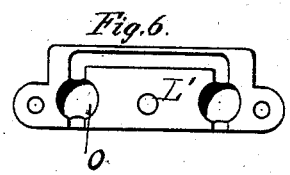
Fig. 5. Fig. 7. Fig. 6.
Witnesses:
F. B. Townsend
A. H. Munday
Inventor:
Jas Hollingsworth
per Munday & Evarts
Attorneys J. HOLLINGSWORTH.
Horse Hay-Rake.
No. 217,463. Patented July 15, 1879.
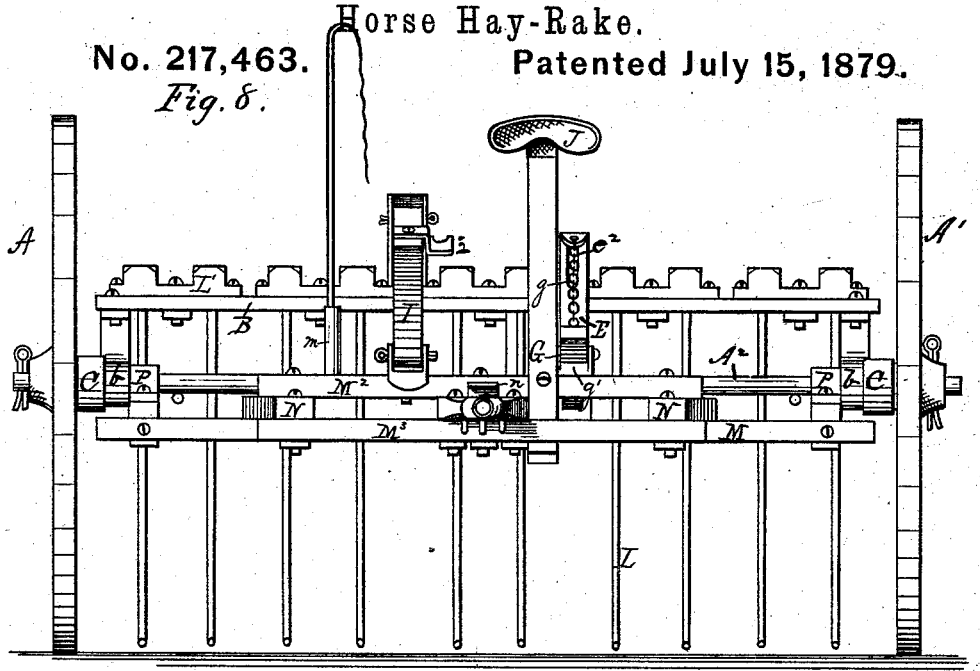
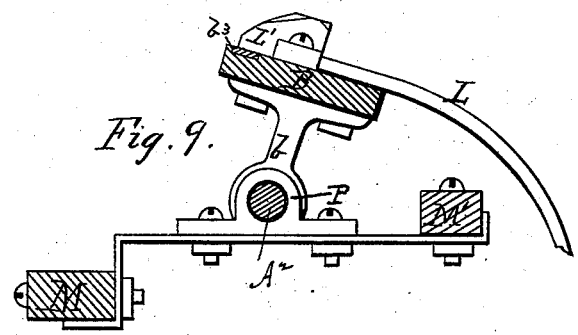
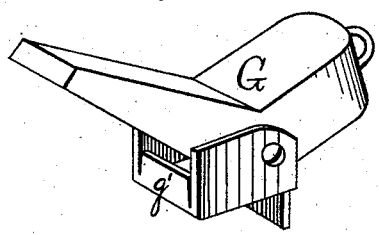
Witnesses:
F. B. Townsend
A. W. Munday
Inventor:
Jas. Hollingsworth
per Munday & Evarts
Attorneys

UNITED STATES PATENT OFFICE.

JAMES HOLLINGSWORTH, OF CHICAGO, ILLINOIS.

IMPROVEMENT IN HORSE HAY-RAKES.

Specification forming part of Letters Patent No. 217,463, dated July 15, 1879; application filed October 11, 1878.

*To all whom it may concern:*

Be it known that I, JAMES HOLLINGSWORTH, of Chicago, in the county of Cook and State of Illinois, have invented certain Improvements in Horse Hay-Rakes, of which the following is a specification.

Figure 1:
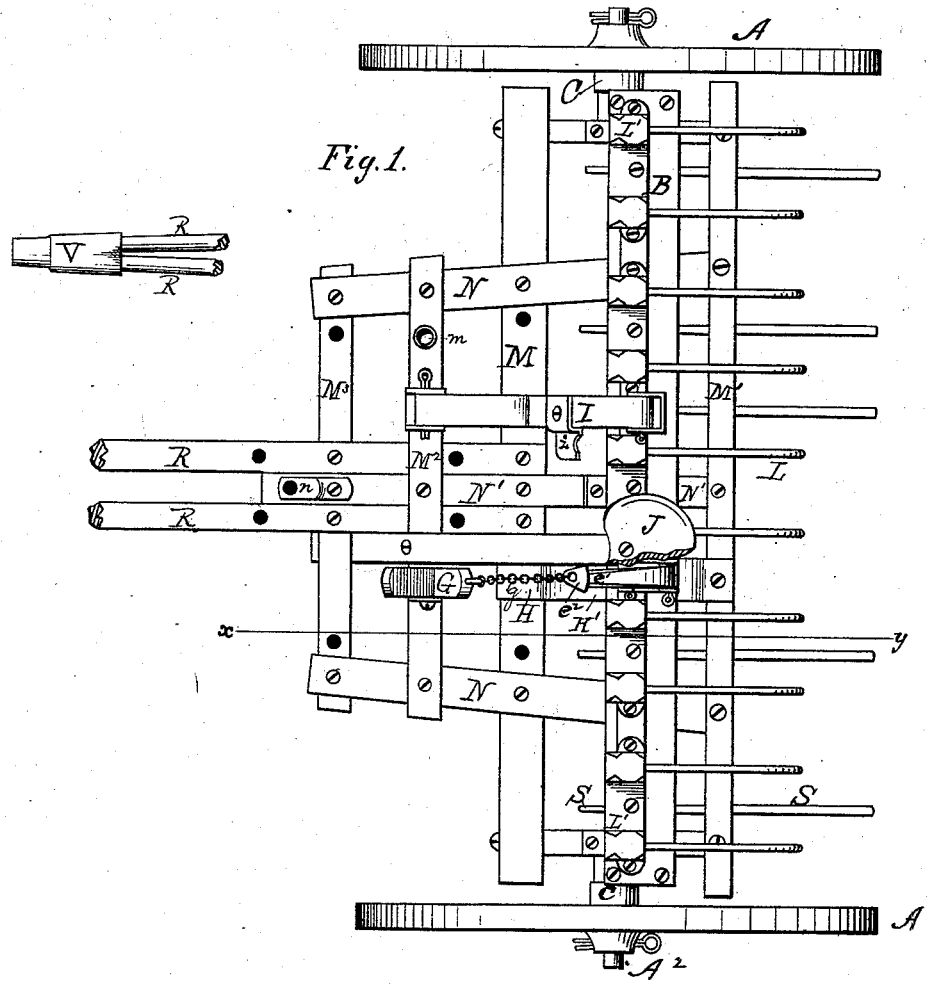
Figure 2:
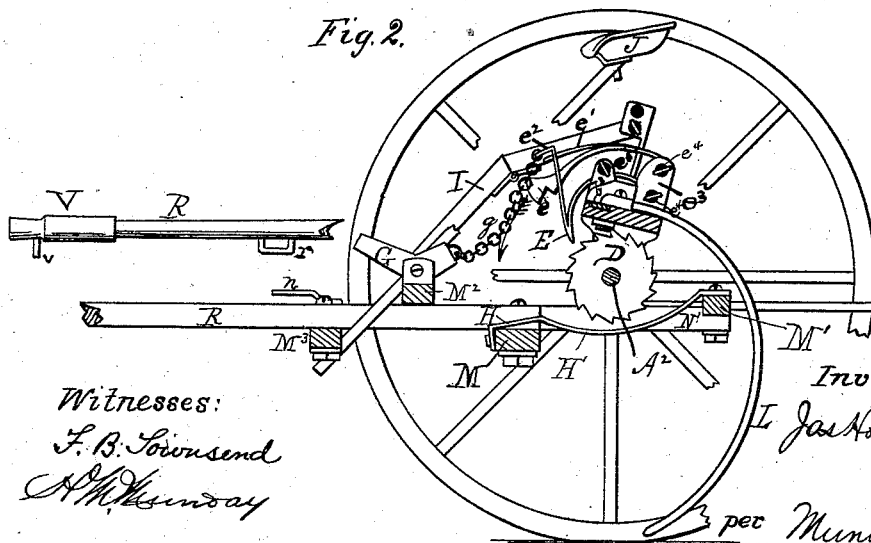

In the accompanying drawings, Figure 1 is a plan view of my improved hay-rake. Fig. 2 is a section on the line $x\,y$ of Fig. 1. Fig. 3 is a fragmentary section along the axle. Fig. 4 is a detached view of the dumping ratchet and pawl. Fig. 5 is a section, and Fig. 6 a bottom view, of tooth-holder. Fig. 7 shows the rake-tooth bent to fit said holder. Fig. 8 is a front view of the machine. Fig. 9 is a partial section across the axle. Fig. 10 is a detached view of the foot-treadle and its holder.

Several of these figures are enlarged to show the parts more clearly.

One of the wheels of my rake (the one lettered A) is loose, and the other, $A^1$, is rigidly affixed to the axle $A^2$, to afford a means of revolving the same as a motive power to raise the rake when required.

Upon the axle is mounted the rake-head B, resting in bearings $b$, which encircle the axle near the wheels. As the grass is liable to tangle in the crevice or space between the face of the wheel-hub and the outer face of the bearings $b$, I provide upon said bearings shields C, and for greater security in this respect cause them to overlap inward extensions $a$ of the wheel-hubs.

D is a ratchet-wheel, rigidly fixed upon the axle, near the center thereof, through the medium of which and a pawl, E, upon the rake-head the motion of the axle is communicated to the rake-head whenever desired. This pawl carries a trigger, $e$, which is at all times depressed by a spring, $e^1$, placed above, with its free end held in an opening in an upward extension, $e^2$, of the pawl. The trigger or latch also passes through this extension $e^2$. Both trigger and pawl are secured in suitable holding devices $e^3$, bolted to the rake-head, and are held therein by bolts or rods $e^4$. A spring, $e^6$, is confined between the pawl and the rake-head, or between the pawl and the holder $e^3$, the purpose whereof is to keep the pawl from contact with the ratchet except when such contact is desired.

The pawl is operated by the driver through the rocking foot-piece G and a connecting-chain, $g$. This foot-piece is elbow-shaped, and is sustained at its toe or forward portion against depression by the casing $g'$, in which it is pivoted, or by an equivalent stop, while at the heel or back end it is free to be depressed by any backward motion of the foot of the driver. In other words, it resists and forms a rest for the foot when the latter is upon the front portion, but yields to the pressure when the foot is moved upon its heel portion. When thus depressed it tightens the chain and draws the pawl down to its work.

The engagement of the pawl and ratchet continues until the oscillation brings the trigger in contact with a stop, H, which, through the medium of said trigger, disengages the pawl, and allows the rake-head to fall back in position to gather again. This stop may be of a piece with a shield, $H'$, extending under the ratchet and protecting the same from accumulations of grass.

I is a jointed upwardly-bending foot-lever or arm for holding the teeth down to their work. A foot-piece, $i$, is secured to and projects from the side of the arm I as a rest for the foot of the driver, who can thereby retain said arm in the position shown, or can trip it at will. The driver's seat J, I locate between this lever and the pawl-actuating foot-piece.

The rake-teeth L are bent at right angles, as in Fig. 7, and held between cast-metal holders $L'$ and the surface of the rake-head. The holders are provided with L-grooves to receive the teeth, and also with cavities $o$, back of the bend and above the teeth, wherein may be inserted rubber or similar springs $o'$ to receive and cushion the upward impact of the teeth. This form of holder supports the teeth against backward strain and lateral motion, and is very convenient and inexpensive.

A frame-work composed of cross-timbers M and $M^1$, one in front and the other in rear of the axle, and extending nearly from wheel to wheel, and longitudinal pieces N N, is supported from the axle by hangers P P at either end of the axle. Other cross-pieces, M² and M³, are placed in front of this frame-work, and one of them supports the foot-piece and one end of the hold-down arm already described and a whip-socket, m, and the other the tongue or shafts R. The seat-bar is held between the two pieces M² and M³. A third longitudinal timber, N', passing over or under all the cross-pieces, bears in front the whiffletree attachment n and a bearing, n', under the axle, and supporting the same, and neutralizing the pressure received thereon from the rake-head through the central bearing, $b^1$. In this manner the frame-work is made to contribute in sustaining the weight of the load, and the axle is stiffened and strengthened in its weakest portion.

The frame-work described, being independent of both rake-head and axle, and complete in itself, is adapted for the attachment of either a tongue or shafts, as it affords convenient points of attachment and support for both; and this has led me to the construction of a kind of tongue which may in a few moments be converted into shafts and back again into a tongue, according as it is desired to use a single or double team.

In the drawings the tongue is shown as consisting of two parts, R R, united at the forward end by a cap, V, having the usual holdback pin v. By removing this cap, and changing the bolt attachments to the holes in the frame and parts R, the two parts of the tongue may be made to do duty as shafts, and in that case the holdback-irons r may be used.

It has been customary where the strippers have been inserted in the rear cross-timber to make them stop short of the axle at their forward ends. This permits the grass to fall upon and wind around the axle—an evil I remedy by making the strippers S to extend under and a short distance in front of the axle.

A strip of metal, $b^3$, is inserted in the upper surface of the rake-head, immediately under the bent ends of the teeth, to prevent the latter from wearing away the wood.

The spring $e^1$ above the latch has for its main function the holding of the pawl in contact with the ratchet until thrown out by the stop. When the pawl is drawn down into contact the latch is caught with the shoulder (shown on the under side thereof) against and just within the upward extension of the pawl, and is kept in that position by the action of said spring until released by contact with said stop.

A stop, $e^5$, is employed to keep the pawl from springing out of its prescribed range of movement.

I claim—

1. The elbow foot-treadle and its holder, the latter being formed to hold the treadle against pressure upon its forward portion, and to permit it to rock when the pressure is applied to its rear portion, substantially as set forth.

2. The combination, with the pawl E, of a treadle and connecting-chain for operating the same, the treadle being constructed to serve both as a rest and as a treadle, substantially as set forth.

3. The pawl E, the spring-depressed latch e, the spring $e^6$ under the pawl, the receiving-casting $e^3$, wherein the pawl and latch are held, combined with the rake-head B, whereon they are supported, and a ratchet, D, fast upon a revolving axle, substantially as set forth.

4. The two-wheeled hay-rake having a revolving axle, and provided with strippers inserted in the rear cross-piece and extending under and forward of the axle.

JAMES HOLLINGSWORTH.

Witnesses:
EDW. S. EVARTS,
H. M. MUNDAY.